Figure 7:
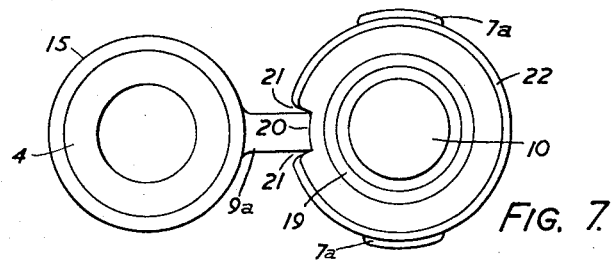

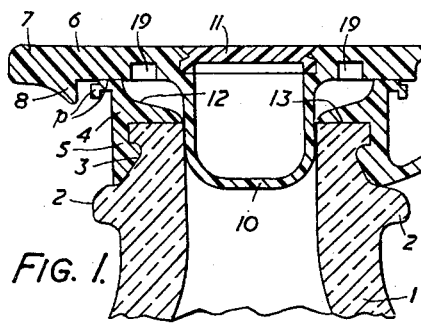
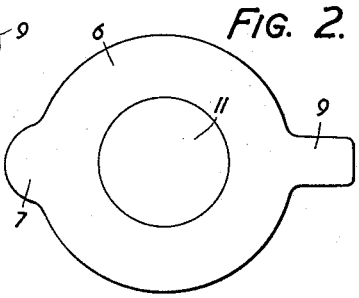
FIG. 1.   FIG. 2.
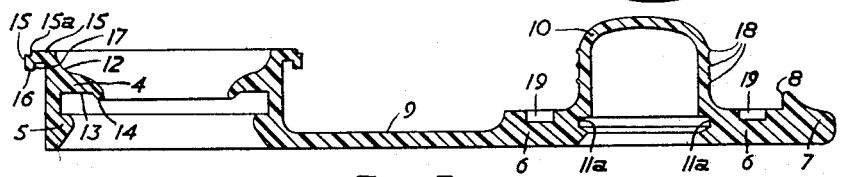
FIG. 3.
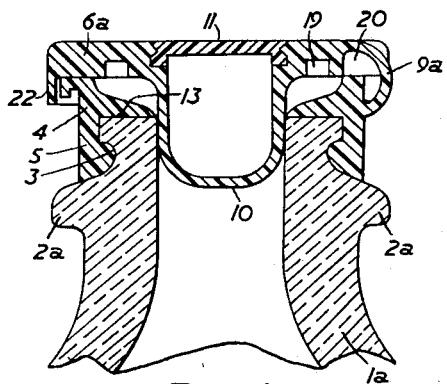
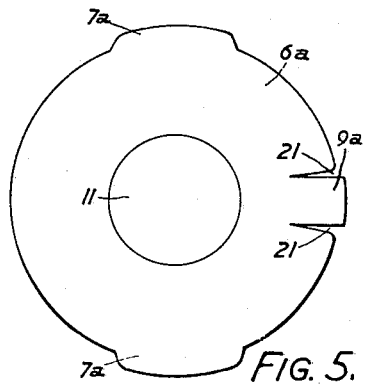
FIG. 4.   FIG. 5.
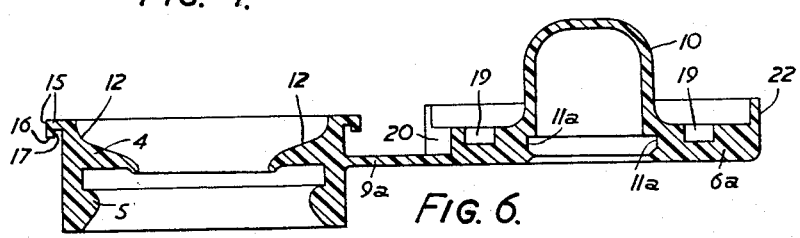
FIG. 6.
INVENTOR
IMRE GOTH
BY *Hanne and Nydick*
ATTORNEYS July 11, 1961  I. GOTH  2,991,913
COMBINED POURING AND SEALING DEVICES FOR CONTAINERS
Filed Jan. 10, 1958  4 Sheets-Sheet 2

INVENTOR
IMRE GOTH
BY Hamm and Nydick
ATTORNEYS

July 11, 1961 I. GOTH 2,991,913
COMBINED POURING AND SEALING DEVICES FOR CONTAINERS
Filed Jan. 10, 1958 4 Sheets-Sheet 3

INVENTOR
IMRE GOTH
BY
ATTORNEYS

July 11, 1961  I. GOTH  2,991,913
COMBINED POURING AND SEALING DEVICES FOR CONTAINERS
Filed Jan. 10, 1958  4 Sheets—Sheet 4

INVENTOR
IMRE GOTH
BY Hane and Nydick
ATTORNEYS

United States Patent Office
2,991,913
Patented July 11, 1961

2,991,913
COMBINED POURING AND SEALING DEVICES FOR CONTAINERS
Imre Goth, 39 Holland Park Road, London W. 14, England
Filed Jan. 10, 1958, Ser. No. 708,096
Claims priority, application Great Britain Jan. 18, 1957
8 Claims. (Cl. 222—153)

This invention relates to combined pouring or drop-dispensing and sealing devices.

There are pouring or drop-dispensing devices known, which can be liquid-tightly attached to the neck of containers, as revealed for example in my prior British specifications Nos. 757,599 published September 19, 1956 and 12,788/54, now British Patent No. 792,301, published March 26, 1958, said devices being either inserted in the pouring aperture of the container, or made to embrace the neck of the latter and are provided with pouring means suitable for dripless pouring of all kinds of liquids. Said devices, however, are constructed to be applied to the neck of the container in addition to and in co-ordination with the standard sealing means of the container, such as a screw-cap or press-cap, stopper, cork or the like, in order to achieve a safe sealing of the container. There are also arrangements known, in which a stopper made of resilient materials, is hinged to the open end of a cylindrical container for packaging tablets or the like, or a lid hinged to a pouring device, as described in my above mentioned prior specifications. The former arrangement, however, does not provide for pouring means, and the sealing means of the latter not being safe enough for transport, the device does not lend itself to be utilised in commercial packaging of liquids.

Although dripless pouring devices, as revealed in my above mentioned specifications, secure clean and dripless pouring of liquids, they cannot always preserve the outer surface of the neck in a dry condition, when employed in conjunction with a screw-cap or press-cap or the like, because a certain amount of liquid adheres to the inner surface or wad of the sealing cap, particularly after the container has been previously in an oblique position or shaken. The liquid adhering to said surface flows to the side portion of the sealing cap after the same has been removed and tilted and is transferred at resealing to the threads of the neck or other outer portions of the closure. This is of particular disadvantage when sticky liquids are to be handled, as a screw-cap may get stuck to the threads of the neck when the container has not been unsealed for a longer period of time.

In addition a screw-cap is sometimes an obstacle to resealing of the container, particularly when dried particles of the liquid cover the threads of the neck and sealing cap.

One object of the present invention is to eliminate the above disadvantages of cap sealed containers, and to dispose of standard sealing means employed in conjunction with a pouring device, providing at the same time not only for a safe sealing of the container, but for unsealing and resealing of the container by a simple process.

Another object of the invention is to provide for commerically packaged liquids, when so required, a "pilfer-proof" sealing, that is to say, a container which cannot be unsealed before breaking or tearing off a safety lock or catch or the like, said catch or lock binding the combined device firmly to the container's neck.

The above objects are achieved by arranging a combined pouring or drop-dispensing and sealing device, made of resilient materials, in such a manner, that a pouring or drop-dispensing member is adapted to be attached to the pouring outlet of a container by being provided with means for securing it by snap action to the suitably shaped outer surface of said outlet, or/and being inserted into said outlet, and a stopper member is hinged to said first member to seal the container by penetrating into the interior of the pouring outlet and making liquid-tight contact with the inner wall of said outlet or suitable portions of said first member, and wherein said combined device is optionally secured to the neck of the container by a safety lock, the same binding said stopper member in the sealing position to a suitably protruding annular rim arranged at said neck, preventing thereby the unsealing of the container without destruction of said safety lock.

The invention may be carried out in a variety of manners relative to pouring or drop-dispensing member as well as the sealing member and may be employed in conjunction with containers made of any suitable material, such as glass, ceramics, plastics, rubber, metals or the like, provided with a suitable neck finish. The combined devices may be made of all resilient materials such as resilient plastics such as Polythene, P.V.C., or rubber or the like. The security lock is preferably made of metals, but any other suitable materials may be employed.

Figure 8:
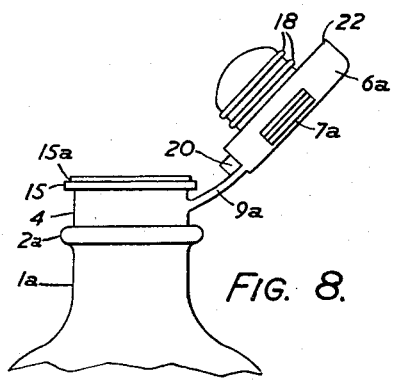
Figure 9:
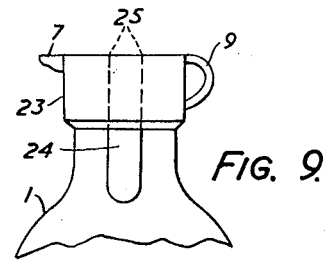
Figure 11:
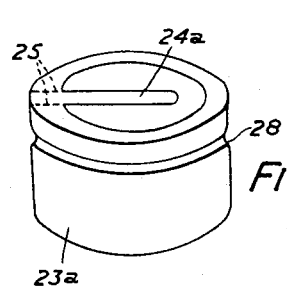
Figure 10:
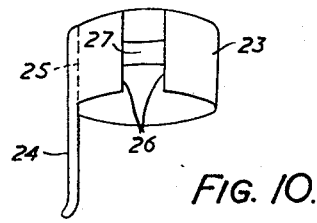
Figure 11A:
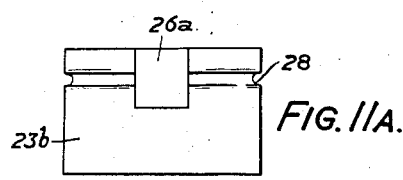
Figure 12:
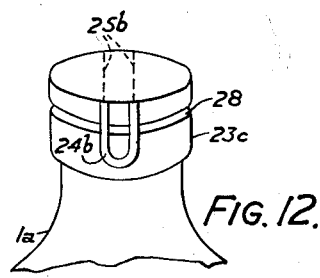
Figure 13:
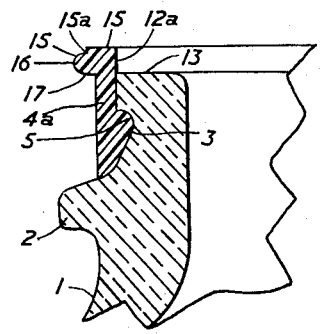
Figure 14:
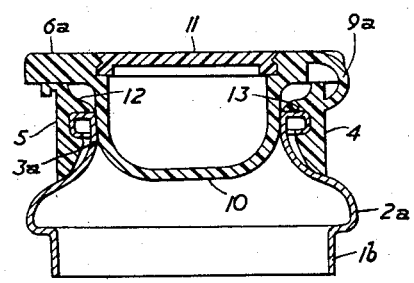
Figure 15:
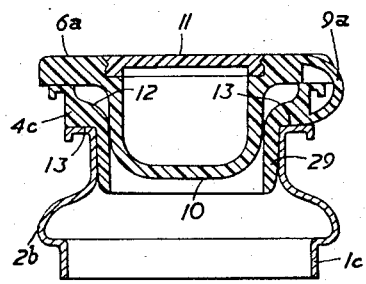
Figure 16:
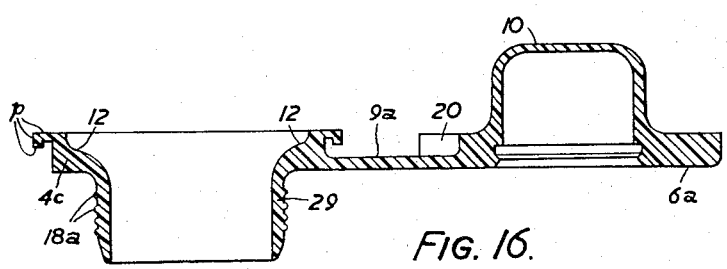
Figure 17:
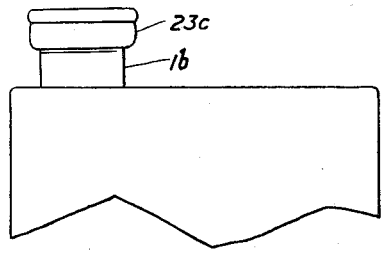
Figure 18:
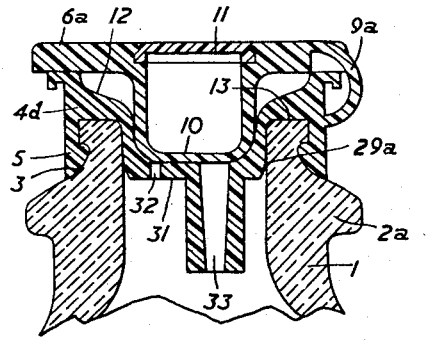
Figure 19:
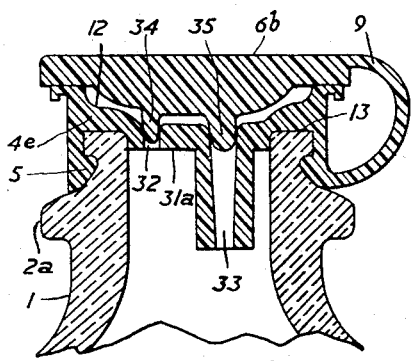
Figure 21:
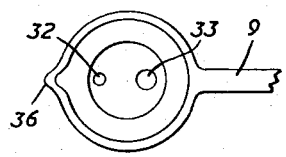
Figure 20:
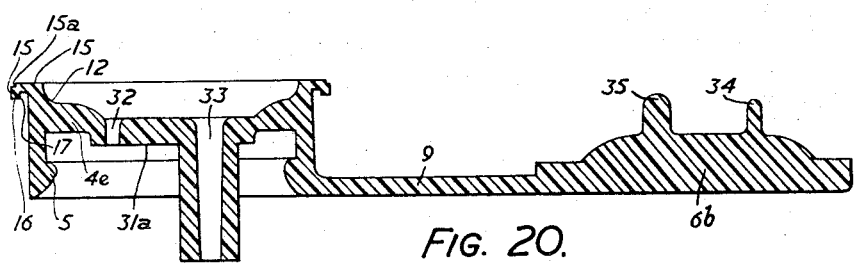

For a better understanding of the invention and to show how it may be carried into effect, the same will now be described by way of examples with reference to the accompanying drawings, in which:

FIGURE 1 is a cross-sectional view of a bottle neck and a combined pouring and sealing device in the sealing position, FIGURE 2 is a top view relating to FIG. 1, FIGURE 3 is a cross-sectional view of the device shown in FIG. 1, in an open condition, as it comes out from the mould, FIGURE 4 is a cross-sectional view of a modified bottle neck and combined pouring and sealing device in the sealing position, FIGURE 5 is a top view relating to FIG. 4, FIGURE 6 is a cross-sectional view of the device shown in FIG. 4 in an open condition, as it comes out from the mould, FIGURE 7 is a top view relating to FIG. 6, FIGURE 8 is a side view of a bottle neck and the combined device in the unsealed condition, FIGURE 9 is a side view of a bottle neck with the combined device according to FIG. 1, provided with a safety lock, FIGURE 10 is a perspective of the safety lock shown in FIG. 9, FIGURE 11 is a perspective of a safety lock of another execution, FIGURE 11A is a side view of another safety lock, FIGURE 12 is a perspective of a bottle neck sealed by the combined device and provided with a safety lock of modified execution, FIGURE 13 is a cross-sectional view of a bottle neck and a different execution of the pouring member of the device, FIGURES 14 and 15 are cross-sectional views of pouring apertures of tins or drums provided with different executions of the combined device, FIGURE 16 is a cross-sectional view relating to the device of FIG. 15, in the moulding position, FIGURE 17 is a side view of the closure of a tin provided with the combined device and safety lock, FIGURES 18 and 19 are cross-sectional views of bottle necks provided with different executions of a combined drop-dispensing and sealing device, FIGURE 20 is a cross-sectional view of a combined device relating to FIGURE 19 in the moulding position and FIGURE 21 is a top view of a drop-dispensing member of the device relating to FIGURE 18 or 19.

In the drawings identical or similar parts of the devices are provided with the same references, and the pouring means of the first member are not shown in detail in every figure.

The bottle neck 1 (FIGURE 1) is provided at a suitable distance below its top surface with an annular recess or undercut 3 of suitable depth and shape, into which an inwardly protruding annular ledge 5 or the like of the pouring or first member 4 of the combined device may be sprung, said ledge holding the combined device firmly at said neck. The first member 4 is provided at a suitable distance above the top level 13 of said neck with an annular pouring surface p, which is arranged outwardly adjoining an annular capillary recess 12, the bottom wall of the same abutting against the top surface 13 and extending towards the aperture of the neck 1. Said bottom wall may be provided with one or more downwardly protruding annular ribs 14 or the like, in order to prevent the poured liquid from creeping between said wall and the top surface 13 of the neck 1. The hinge 9 connecting said first member with disc 6 of the stopper or second member of the device is rooted in the present example at the bottom portion of said first member. The annular ledge or rim 2 of the bottle neck 1 is arranged below the recess 3 and having a substantially identical diameter to that of the disc 6 of said second member of the device, the bottom surface of said ledge provides for supporting the bottom end of a safety lock to be described further below.

The disc (FIGURES 1, 2 and 3) of the second member serves as a base for the stopper 10, said disc being arranged to have a suitable thickness in order to give the resilient material the strength to resist the levering force at the unsealing of the container and said disc suitably having a larger diameter than that of the most protruding portion of the pouring surface of said first member, in order to protect said pouring surface when the stopper is in the sealing position. In order to reduce the amount of material, contained in said disc, the same may be provided with one or more annular grooves 19 or the like or any other suitable hollow spaces. Said disc is provided at the opposite side of the hinge 9 with a protruding portion 7 of suitable strength for levering up the stopper from the sealing position. The stopper 10, which has a hollow inside, protrudes from the disc 6, and is arranged to have a cylindrical portion of suitable diameter to make firm and liquid-tight contact with the inner wall of the neck 1, when pressed into the sealing position. The end portion of said stopper is suitably made in a tapering manner in order to facilitate its location and penetration into the aperture of said neck and the cylindrical portion of the stopper may be provided with outwardly protruding small annular ribs 18 or the like, in order to ease the levering up and sealing process and promote liquid-tight contact with the wall of the aperture. The open disc-side end of the stopper may be provided with a recess 11a, into which a disc 11 of suitable shape can be sprung in a known manner in order to cover the hollow space of said stopper. The protrusion 7 of said disc provided for levering up the stopper may be suitably provided with a downwardly protruding (in the sealing position) ledge 8 in order to protect the pouring surface of the first member 4 from injury by nails or the like at the unsealing process of the container. In order to achieve dripless pouring of liquids of all surface tensions and/or viscosity by the first member 4 of said combined device, the pouring means of the same may suitably be arranged according to any of my prior specifications, but especially in the following manner: The annular recess 12 is capable of holding at least one drop of the liquid in the pouring position in conjunction with the adhesion of the liquid at the first part 15 of the pouring surface, arranged outwardly adjoining said recess in an outwardly and downwardly projecting direction, while the second part 17 of said surface is arranged in a substantially upwardly projecting direction in the upright position of the container, or at such an inclination that the same will be upwardly projecting in all pouring positions of the container (FIG. 8), the meeting or merging area 16 of said first and second parts being arranged within the influence of capillary suction of said recess and said first part may be provided with means for producing minor capillary attraction, such as an annular step-like shoulder 15a or the like, in order to increase the adhesion of the liquid at said first part.

The above described combined device may be modified in such a manner, that the disc 6a (FIGURES 4, 5, 6, 7, and 8) of the stopper member together with the hinge 9a will have a substantially annular shape in the sealing position of said stopper member (as shown in FIGURE 5) enabling thereby the potential application of a cylindrical safety lock without apertures for protruding parts of the device. This is achieved by providing the disc 6a with a hollow space 20 extended at the area of the hinge 9a as far inside the perimeter of said disc, as the hinge should be enabled to bend inside said perimeter, and said hinge is divided from the body of the disc by the spaces 21 arranged at both sides of the hinge in addition to said hollow space 20. In order to reduce the length of said hinge, the same may be rooted at the middle portion of the first member 4, the latter being substantially arranged like that of the example of FIGURE 1. The disc 6a is suitably provided with one or two slightly protruding portions 7a of suitable shape for levering up the stopper 10, said protrusions being preferably arranged in a diagonal manner at a right angle to the longitudinal axis of hinge 9a. It will be understood, that the latter arrangement of the protrusions 7a may also be applied to the execution of the first example of FIGURES 1, 2 and 3. The disc 6a may be provided at its perimeter (sparing the hinge) with a protruding ledge 22 of suitable width and thickness, said ledge protecting the pouring surface of the first member 4 in the sealing position and reducing the flexibility of the disc 6a at the same time. The diameter of the protruding ledge 2a of the bottle neck is enlarged relative to the ledge 2 of FIGURE 1, in order to make it substantially identical with the overall diameter of disc 6a, which latter is larger relative to the diameter of the pouring surface of the first member, than in the previous example of FIGURES 1, 2 and 3. FIGURE 6 shows the construction of the present example in the moulding position in a cross-sectional view, while the top view of the device of FIGURE 7 in the same position shows the interruption of the ledge 22 at the area of the hinge 9a. The side view of the bottle neck 1 (FIGURE 8) illustrates the combined device after the container has been unsealed by levering up the stopper 10 at the protruding portion 7a of the disc 6a, the stopper member being held in a suitable position by the resilient hinge 9a.

In both of the above described executions of FIGURES 1–8 the inner diameter of the portion of the first member 4 abutting against the top surface 13 of the neck 1 is preferably arranged smaller than the outer diameter of the cylindrical portion of the stopper 10, enabling thereby the stopper member to remain in position when folded into the first member before application to the bottle neck 1. This is of importance for automatic application of the combined device to said neck, as it will be described further below.

The side view of bottle neck 1 (FIGURE 9) with the applied safety lock 23 relates to the combined device shown in FIGURE 1 in the sealed condition, said safety lock being provided with suitable apertures for the protruding lever 7 and hinge 9 and a protruding strip of its material 24 serving as a grip. By pulling said strip along perforated or precut tracks 25, the safety lock may be destroyed in order to enable the unsealing of the container.

The safety lock 23 (FIGURE 10) is preferably made of metals, such as aluminium, tin plate or brass or the like, and the cylindrical portion of the same is provided with a suitably shaped aperture 27 for the protruding levering portion of the disc of the sealing member and an open space 26 of suitable width for the hinge of the combined device, which latter is placed in a folded condition into said safety lock before application to the neck of the container. At application the whole unit, said safety lock containing the combined device, is pressed upon the neck of the container and the bottom portion is rolled under the protruding ledge of the neck as previously mentioned. This execution lends itself for application to the necks of containers by hand, using a hand-tool for rolling the safety lock under said ledge.

In order to enable automatic application of the combined device placed into a safety lock by a machine, the safety lock 23a (FIGURE 11) is arranged at its cylindrical portion without apertures for protruding portions of the stopper member of the combined device, and the strip 24a of its material for destruction of said lock is arranged at any suitable portion of the same without protruding from the cylindrical body of said lock. In the present example the strip 24a is arranged at the top portion of the lock 23a, which is to embrace a portion of the disc of the stopper member, the precut tracks 25a being arranged partly at the top and partly at the side portion of said lock, which is suitably provided with an annular indentment 28 for automatic selection in a similar manner as is known to be done for automatic application of screw-caps. This arrangement of the safety lock is suitable for automatic application of combined devices according to the invention, which are provided with a sealing member according to FIGURES 4–7.

Nevertheless, for the sake of moulding facilities of the combined device the hinge may be arranged to protrude outside the perimeter of the sealing member's disc in the sealing position, and the safety lock 23b (FIGURE 11A) may be provided with a suitable aperture 26a for the protruding hinge, said lock being arranged substantially in a similar manner, as that of FIGURE 11.

The bottle neck 1 (FIGURE 12) is provided with a combined device and safety lock 23c, the latter being arranged with a partially separated strip 24b for the purposes of destruction of said lock at the side portion of the same, and the precut or indented tracks or perforations 25b are arranged across the top portion and side of the lock opposite the separated strip 24b.

The latter described arrangements enable the automatic application of the combined devices to the necks of containers in the following manner:

The combined device is folded by placing the stopper of the stopper member into the aperture of the first member, and the folded device is placed into the safety lock either by hand or by machine. The safety lock now containing the combined device is fed to a capping machine in a similar manner like screw-caps, and while a head pressure exerted by the capping machine at the top of the device springs the inwardly protruding ledge 5 of the first member into the recess 3 of the neck, the bottom edge of the safety lock 23a, or 23b, or 23c is rolled under the protruding ledge 2a of the neck.

When the combined device is applied by hand to the neck of containers, the first member 4a (FIGURE 13) may be arranged to protrude upwardly from the top surface 13 of the neck 1 to a suitable distance in such a manner, that the protruding portion, inwardly adjoining the first part 15 of the pouring surface, builds together with the top surface 13 of the neck 1 an annular recess 12a for producing, capillary suction to be exerted at the area of the pouring surface 15, 15a, 16 and 17. As the latter execution of the first member is not extended over the top surface 13 of the neck, the stopper member, which is not shown in the illustration, cannot stay in the aperture of said first member, when folded into the same.

When a combined device, according to the invention, is to be applied to the neck 1a (FIGURE 14) of a tin or drum or the like, the metal plate of said neck is arranged at the top portion of the same to turn outwardly to form the substantially horizontal surface 13, and turning again downwardly and inwardly to form a recess 3a, into which the inwardly protruding annular ledge 5 of the first member 4 may be sprung. The ledge 2a is arranged to roll under its bottom surface one of the above described safety locks. The stopper 10 of the device seals the container by making liquid-tight contact with the cylindrical portion of the inner wall of the neck.

The first member 4c (FIGURES 15 and 16) of a modified device is inserted with its cylindrical portion 29 into the aperture of the neck 1c, and the stopper 10 seals the container by making liquid-tight contact with the inside wall of said cylindrical portion. The portion of the first member incorporating the annular recess 12 abuts against the substantially horizontal top surface 30 of the neck, which is formed in the present example of sheet metal. The hinge 9a connecting said first member with the disc 6a of the sealing member is preferably rooted at the bottom part of the portion of said first member, which abuts against the top surface 30 of the neck. In order to achieve a firm enough fit of the cylindrical portion 29 of the first member in the neck and ease at the same time the insertion of the device into neck, said portion may be provided at its outer surface with small protruding annular ribs 18a or the like, as shown in FIGURE 16, which illustrates the present example in the moulding position.

FIGURE 17 illustrates the closure of a tin or drum or the like, provided with one of the above described combined devices and security locks.

The first member 4d (FIGURE 18) of a combined device may be arranged in such a manner, that the same can be used for drop-dispensing of liquids in all pouring positions of the container. Said first member is arranged with an inwardly protruding annular ledge 5 to be sprung into the recess 3 of the neck 1, and a cylindrical portion 29a, which penetrates at the same time into the inside of the neck 1, and suitably arranged with a tapering bottom portion for easing the penetration of the same. Said bottom portion is closed with a substantially horizontal wall 31, said wall being provided with a smaller aperture 32 for release of the liquid and a larger one 33 for intake of air, the latter preferably arranged in conjunction with an air-inlet tube, as shown in the drawing. The stopper 10 of the stopper member 6a seals the container by making liquid-tight contact with the inside wall of the cylindrical portions 29a of the first member 4d.

In a modified execution of a combined drop-dispensing and sealing device the first member 4e (FIGURES 19 and 20) is arranged to extend inwardly from the top surface 13 of the neck 1 and form a substantially horizontal wall 31a, which may be arranged to partially protrude into the aperture of the neck. Said wall is provided with an aperture 32 for release of the liquid and another one for intake of air in a similar manner, as described in the previous example. The stopper member 6b is arranged with two cylindrical stoppers 34 and 35, of suitable diameters which are arranged to coincide and penetrate into the apertures 32 and 33 in the sealing position of the stopper member. In order to ease the location and penetration of said stoppers into said apertures, the stoppers may be arranged in a tapering manner at their end portions and the apertures of said wall may be made to widen at their upper portions. The disc 6b of the stopper member is preferably made with a thickened portion at the area of the stoppers 34 and 35 in order to reduce the length of said stoppers and at the same time reduce the flexibility of said disc as well at the unsealing process of the container. In FIGURE 20 the device is shown in the moulding position.

In either of the latter described combined drop-dispensing devices the first member may be provided with a small spout 36 (FIGURE 21) arranged to face the aperture 32 for release of the liquid. The previously described pouring means may be incorporated in the protruding spout only or/and annularly as well.

It will be understood, that constructional details of the above described examples of the invention are interchangeable in execution of the combined pouring or drop-dispensing and sealing devices.

I claim:

1. A drip proof device for dispensing liquid from a pouring outlet of a container selectively by pouring or dropwise, respectively, said device comprising an annular dispensing member having a flexible wall portion force fitting the container outlet for securing the device to the outlet in liquid dispensing positional relationship, a radially outwardly extending pouring lip integral with said annular dispensing member, said dispensing member defining a circular space, and a stop member having a center portion of larger diameter than and receivable within said circular space defined by said dispensing member and said outlet to effect a liquid tight seal of said outlet, said stopper member including a hinge hinged to the dispensing member for movement of said stopper member between a position in which said center portion thereof penetrates into said space for closing the same and an adjusted position withdrawn from said space, said dispensing member having an upwardly protruding portion terminating in a pouring surface, said pouring surface being at a higher level than said top surface of the pouring outlet, said pouring surface and said top surface defining a recess therebetween for producing capillary suction between said top surface and the upwardly protruding portion of said dispensing member, said recess inwardly adjoining said pouring surface, said upwardly protruding portion of the dispensing member being extended inwardly to abut against the top surface of the pouring outlet, and said recess being formed in said upwardly protruding portion.

2. A drip proof device for dispensing liquid from a pouring outlet of a container by pouring or by drops, said device comprising an annular dispensing member having a flexible wall portion force fitting the container outlet for securing the device within the outlet in liquid dispensing positional relationship, a radially outwardly extending pouring lip integral with said annular dispensing member, said dispensing member defining a circular space, a stopper member having a center portion of larger diameter than and receivable within said circular space defined by said dispensing member and said outlet to effect a liquid tight seal of said outlet, said stopper member including a hinge hinged to the dispensing member for movement of said stopper member between a position in which said center portion thereof penetrates into said space for closing the same and a position withdrawn from said space, said dispensing member including a pouring surface having two parts, one of said two parts of said pouring surface being arranged in outwardly and downwardly projecting direction, the other one of said two parts of said surface projecting upwardly in all pouring positions of the container, the meeting area of said two parts being disposed within the area of influence of capillary suction of an annular recess defined by an inner wall portion of said dispensing member inwardly adjoining to said one part of the pouring surface, said one part of the pouring surface being provided with at least step-like shoulder for increased adhesion of the liquid.

3. A drip proof device for dispensing liquid from a pouring outlet of a container by pouring or by drops, said device comprising an annular dispensing member having a flexible wall portion force fitting the container outlet for securing the device within the outlet in liquid dispensing positional relationship, a radially outwardly extending pouring lip integral with said annular dispensing member, said dispensing member defining a circular space, a stopper member having a center portion of larger diameter than and receivable within said circular space defined by said dispensing member and said outlet to effect a liquid tight seal of said outlet, said stopper member including a hinge hinged to the dispensing member for movement of said stopper member between a position in which said center portion thereof penetrates into said space for closing the same and a position withdrawn from said space, said dispensing member including a pouring surface having two parts, one of said two parts of said pouring surface being arranged in outwardly and downwardly projecting direction, another one of said two parts of said surface projecting upwardly in all pouring positions of the container, the meeting area of said two parts being disposed within the area of influence of capillary suction of an annular recess defined by an inner wall portion of said dispensing member inwardly adjoining to said one part of the pouring surface, said one part of the pouring surface being provided with at least one step-like shoulder for increased adhesion of the liquid, said stopper member including a disc and center portion depending therefrom, the hinge being secured to said disc, and said disc at the opposite side of said hinge having an outwardly protruding portion for unseating said stopper when unsealing the container.

4. A device, according to claim 3, wherein said disc has a larger diameter than the widest portion of the pouring surface of said dispensing member, the perimeter of said disc being provided with a rim, which is downwardly projecting in the sealing position of the stopper member and in order to protect the pouring surface of said first member.

5. A device, according to claim 4, wherein the disc of the stopper member includes hollow space at the hinge root portion of the same, said hinge being rooted within said space inwardly from the perimeter of said disc for enabling the hinge to be bent within the perimeter of said disc, restricting thereby any substantial protrusion of the hinge outside the perimeter of said disc in the sealing position of the stopper member.

6. A device, according to claim 5, wherein the perimeter of said disc is provided with at least one protruding portion for levering up the stopper member, said portions being arranged at substantially 90° to the centre line of the hinge.

7. A drip proof device for dispensing liquid from a pouring outlet of a container by pouring or by drops, said device comprising an annular dispensing member having a flexible wall portion force fitting the container outlet for securing the device within the outlet in liquid dispensing positional relationship, a radially outwardly extending pouring lip integral with said annular dispensing member, said dispensing member defining a circular space, a stopper member having a center portion of larger diameter than and receivable within said circular space defined by said dispensing member and said outlet to effect a liquid tight seal of said outlet, said stopper member including a hinge hinged to the dispensing member for movement of said stopper member between a position in which said center portion thereof penetrates into said space for closing the same and a position withdrawn from said space, said device in the sealing position being firmly bound to the neck or pouring outlet of the container by a safety lock, said stopper member including a disc shaped portion and said lock embracing at least a portion of said disc shaped member, the bottom surface of a protruding ledge arranged at a portion of the outer surface of the pouring outlet, said ledge having a substantially identical diameter to that of said disc shaped portion of the stopper member, said lock being arranged as a hollow substantially cylindrical member with at least a partially closed portion, the cylindrical portion of said top portion being arranged to be partly rolled under said protruding ledge of the pouring outlet.

8. A drip proof device for dispensing liquid from a pouring outlet of a container by pouring or by drops, said device comprising an annular dispensing member having a flexible wall portion force fitting the container outlet for securing the device within the outlet in liquid dispensing positional relationship, a radially outwardly extending pouring lip integral with said annular dispensing member, said dispensing member defining a circular space, a stopper member having a center portion of larger diameter than and receivable within said circular space defined by said dispensing member and said outlet to effect a liquid tight seal of said outlet, said stopper member including a hinge hinged to the dispensing member for movement of said stopper member between a position in which said center portion thereof penetrates into said space for closing the same and a position withdrawn from said space, and a safety lock fitted over said dispensing member and said stopper member in the penetrating position of said stopper member fixedly mounted over an outer wall portion of said container outlet to prevent withdrawal of the stopper member without destruction of the safety lock.

References Cited in the file of this patent

UNITED STATES PATENTS

| | | |
|---|---|---|
| 1,452,967 | Freedman | Apr. 24, 1923 |
| 2,173,662 | Plattring et al. | Sept. 19, 1939 |
| 2,625,306 | Murphy | Jan. 13, 1953 |
| 2,690,861 | Tupper | Oct. 5, 1954 |
| 2,715,480 | Livingstone | Aug. 16, 1955 |
| 2,760,683 | Diether | Aug. 28, 1956 |
| 2,778,533 | Savary | Jan. 22, 1957 |
| 2,783,923 | Croce | Mar. 5, 1957 |
| 2,826,343 | Albiani | Mar. 11, 1958 |
| 2,851,203 | Nowak | Sept. 9, 1958 |
| 2,874,882 | Sethne et al. | Feb. 24, 1959 |

FOREIGN PATENTS

| | | |
|---|---|---|
| 75,994 | Denmark | June 15, 1953 |
| 708,165 | Germany | July 14, 1941 |